United States Patent [19]

Michael

[11] Patent Number: 4,658,672
[45] Date of Patent: Apr. 21, 1987

[54] SIMPLIFIED POWER SHIFT TRANSMISSION
[75] Inventor: Richard A. Michael, Waterloo, Iowa
[73] Assignee: Deere & Company, Moline, Ill.
[21] Appl. No.: 853,787
[22] Filed: Apr. 18, 1986
[51] Int. Cl.[4] ........................................... F16H 57/10
[52] U.S. Cl. ...................................... 74/759; 74/769; 74/765
[58] Field of Search ................. 74/764, 765, 768, 769, 74/758, 759

[56] References Cited
U.S. PATENT DOCUMENTS

| | | | |
|---|---|---|---|
| 2,775,144 | 12/1956 | Kelbel | 74/769 |
| 2,826,098 | 3/1958 | Holdeman | 74/759 |
| 2,862,403 | 12/1958 | Miller | 74/759 X |
| 2,971,385 | 2/1961 | Miller | 74/759 X |
| 3,209,618 | 10/1965 | Schwab | 74/759 X |
| 4,291,592 | 9/1981 | Meyerle et al. | 74/768 X |
| 4,345,490 | 8/1982 | Madson | 74/761 |
| 4,346,622 | 8/1982 | Pierce | 74/688 |
| 4,369,672 | 1/1983 | Ohtsuka | 74/688 |
| 4,417,484 | 11/1983 | Gaus et al. | 74/688 |
| 4,420,992 | 12/1983 | Windish | 74/781 R |

FOREIGN PATENT DOCUMENTS

| | | | |
|---|---|---|---|
| 1780702 | 8/1975 | Fed. Rep. of Germany | 74/759 |
| 1780703 | 8/1975 | Fed. Rep. of Germany | 74/759 |
| 1130491 | 2/1957 | France | 74/759 |
| 809863 | 3/1959 | United Kingdom | 74/759 |
| 280145 | 11/1970 | U.S.S.R. | 74/759 |

OTHER PUBLICATIONS

*New John Deere Industrial Transmission*, SAE Paper 790524, by J. R. Harvey, John Deere Product Engineering Center, Waterloo, Iowa, Apr. 1979.
Information brochure published by Detroit Diesel Allison and dated 11/1983.
*John Deere Power Shift Transmission*, SAE Paper 739 A, by K. J. Harris and J. K. Jensen, John Deere Waterloo Tractor Works, Waterloo, Iowa, Sep. 1963.

*Primary Examiner*—Leslie Braun
*Assistant Examiner*—Dirk Wright

[57] ABSTRACT

A multi-speed power shift transmission providing a total of six speeds including forward and reverse gears with a minimum of friction elements. The transmission uses one compound planetary assembly of the Ravigneaux type coupled to a simple planetary assembly. The planetary assemblies are joined by two simple interconnections which transfer power between the planetary sections. The transmission uses three brakes and two clutches to provide the total of six (6) speed changes. Connection of the planetary carrier of the compound planetary assembly to the ring gear of the simple planetary assembly and a primary sun gear of the compound planetary assembly to the sun gear of the simple planetary assembly provides four forward speeds and two reverse speeds. This interconnection arrangement between the two planetary assemblies also provides favorable power splitting across the planetary sections which will permit a reduction in the size of gear elements and other transmission components.

7 Claims, 7 Drawing Figures

| GEAR | C1 | C2 | B1 | B2 | B3 | RATIO |
|---|---|---|---|---|---|---|
| 1 | X |  |  |  | X | 4.59 |
| 2 | X |  |  | X |  | 2.20 |
| 3 | X |  | X |  |  | 1.52 |
| 4 | X | X |  |  |  | 1.00 |
| R1 |  | X |  |  | X | 6.06 |
| R2 |  | X |  | X |  | 1.36 |

FIG. 2

SIMPLIFIED POWER SHIFT TRANSMISSION

BACKGROUND OF THE INVENTION

1. Field of Invention

This invention relates to a multi-speed power shift transmission, and more particularly, to a power shift transmission having two planetary sections for providing a plurality of forward and reverse speeds.

2. Description of Prior Art

Power shift transmissions have been used for many years to allow earthmoving and agricultural equipment to deliver the full power of an engine to the drive train without interruption by gear changes. Uninterrupted power flow is necessary to prevent a loss of speed during gear changes, which would occur rapidly under the heavy drag loadings of industrial and agricultural vehicles. Numerous arrangements of power shift transmissions have been set forth in the art to satisfy the varying needs of the vehicles into which they are incorporated. U.S. Pat. No. 4,420,992 and the references cited therein exemplify much of the art related to power shift transmissions. The major thrust of U.S. Pat. No. 4,420,992 and much of the prior art, has been to increase the number of speeds available in a power shift transmission.

The typical power shift transmission contains a series of planetary gear assemblies. These planetary gear assemblies comprise transmission subassemblies. In order to increase the available speeds in a power shift transmission, the prior art as shown the joining and interconnection of numerous transmission sub-assemblies. These planetary systems are coupled to perform speed changes through the selective connection or restraint of the planetary elements by a series of friction devices. Many of the power shift transmissions include complex planetaries or transmission subassemblies. One such planetary assembly is commonly referred to as a Ravigneaux planetary which typically consists of a ring gear, two sun gears and a pair of intermeshing planetary gear sets with one of the planetary gear sets meshing with one sun gear and the ring gear and the other planetary gear set meshing with the other sun gear. The connection of a Ravigneaux planetary to a simple planetary system is known from U.S. Pat. No. 4,345,490 and S.A.E. paper 8163, title "John Deere Power Shift Transmission" presented to the National Farm, Construction and Industrial Machinery meeting on Sept. 9-12, 1963. Although the interconnection of various planetary transmission subassemblies in power shift transmissions has effectively provided the various speeds required, the numerous and complex interconnections increase the size and expense of these transmissions while making assembly more difficult.

In addition to providing numerous speed ratios, the planetary assemblies and power shift transmissions have also been arranged to advantageously split power between the planetary elements. This power splitting could permit a reduction in the size of planetary elements due to a reduction in sustained loads on individual components. However, it is often the case that transmissions providing advantageous power splitting in certain gear ranges will recirculate power in other gear ranges. Recirculation of power multiplies loadings on transmission elements, thereby negating the advantage of power splitting in other gear ranges.

It is an objective of this invention to provide a power shift transmission that overcomes one or more of the aforementioned problems.

It is also an objective of this invention to provide a power shift transmission having a reduced number of planetary sections and interconnections between elements.

It is a further objective of this invention to provide a power shift transmission having six speeds, including reverse gears, using only two planetary sections and five friction elements.

A yet further objective of this invention is to provide a power shift transmission which provides advantageous power splitting in certain gear ranges and avoids power recirculation through transmission elements to allow a reduction in the size of the planetary assemblies.

SUMMARY OF THE INVENTION

Accordingly, this invention is directed to a power shift transmission having two planetary sections. One section consists of a compound planetary having a sun gear, a ring gear, a compound planetary carrier rotatably supporting two sets of intermeshing planet gears and an additional reaction element. In the compound planetary, one set of planet gears intermeshes with the sun gear and ring gear while the other set of planet gears intermeshes with the first mentioned planet gear set and the reaction gear. A series of brakes selectively restrain the reaction gear, ring gear, or planetary carrier. A set of clutches connects the sun gear and/or the reaction gear with an input or output shaft of the transmission. The other planetary section is a simple planetary assembly made up of a sun gear, a single web planetary carrier rotatably supporting a single set of planet gears, and a ring gear. Two of the simple planetary elements are coupled to the compound planetary section by a pair of interconnections attached respectively to the planetary carrier and sun gear of the compound planetary section, the remaining uncoupled element of the simple planetary section is attached to another input/output shaft for the transmission.

In a more specific embodiment, this invention is a power shift transmission made up of a compound planetary assembly coupled to a simple planetary assembly. The compound planetary is of the Ravigeaux type having a primary sun gear, a secondary sun gear, a ring gear and compound planetary carrier supporting a primary and secondary set of intermeshing planet gears. The primary planet gear set intermeshes with the ring gear and the primary sun gears. The secondary planet gear set intermeshes with the secondary sun gear as well as the primary planet gear set. The primary and secondary sun gears can be selectively coupled to an input shaft and each other. A set of brakes fixes the secondary sun gear or the ring gear of the compound planetary assembly against rotation. The simple planetary assembly has a sun gear connected to the primary sun gear, a planetary carrier rotatably supporting a single set of planet gears and connected to the output shaft of the transmission, and a ring gear connected to the compound planetary carrier of the compound planetary assembly which may be fixed against rotation.

Other details, objects and embodiments of this invention are set forth in the following detailed description.

BRIEF DESCRIPTION OF THE DRAWINGS

FIG. 2 is a table setting forth the necessary engagement of friction elements to obtain the listed gear drives and ratios in the transmission of FIG. 1.

DESCRIPTION OF THE PREFERRED EMBODIMENT

Figure 1:
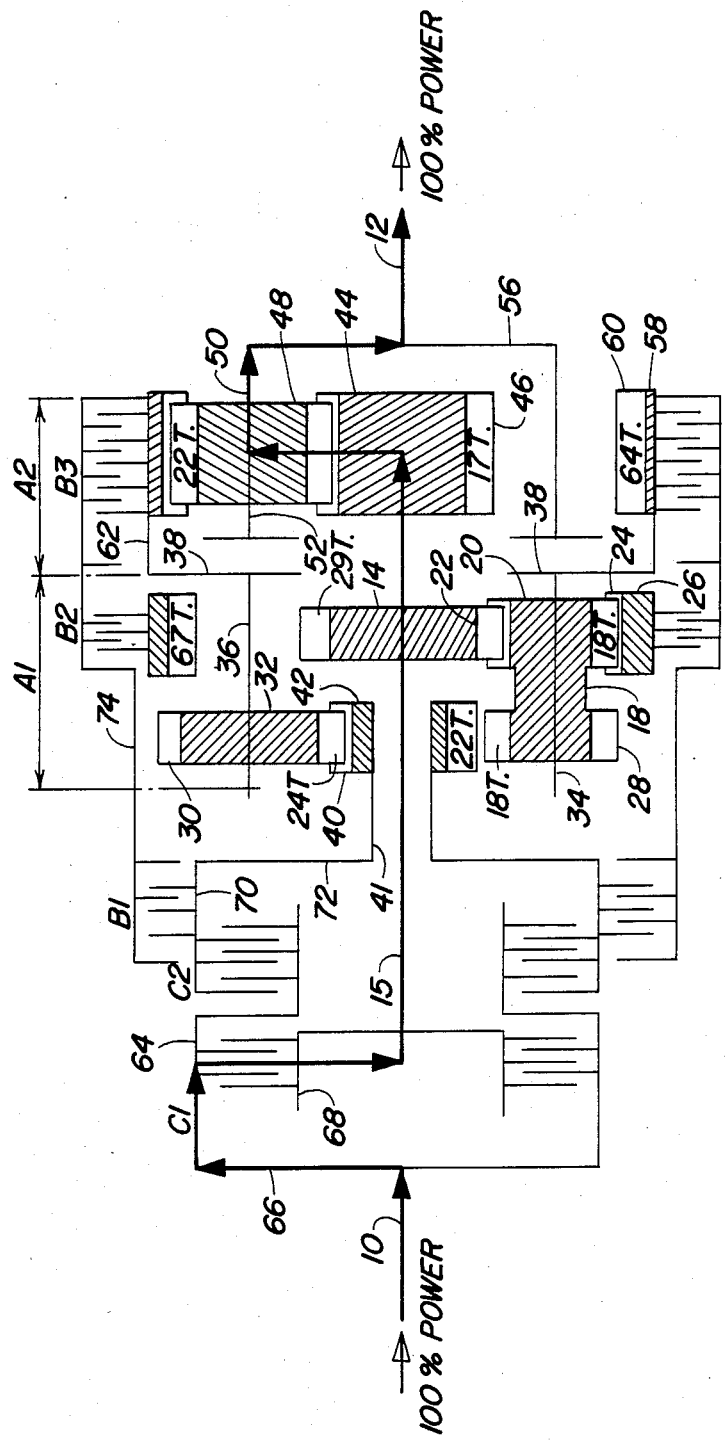
FIG. 1 is a schematic representation of the preferred arrangement for the transmission of this invention.

A preferred arrangement for the transmission of this invention is shown, in FIG. 1, connecting an input shaft 10 and an output shaft 12. Input shaft 10 is usually connected to an internal combustion engine via a torque converter. Output shaft 12 can be connected to the remainder of a vehicle drive train which may include drive distribution assemblies and additional speed change, transmission assemblies. The transmission connecting the input and output shafts is composed of a compound planetary section (A1), a simple planetary section (A2), clutch elements (C1-C2) and brake elements (B1-B3). The number of teeth on each gear element is indicated by a number preceding the letter T on each gear element. For the sake of simplicity, bearings, guides, sleeve arrangements and other details, which are necessary for the operation of the invention but well known to those skilled in the art, have been omitted.

Looking then at the compound planetary section, this arrangement is of the type commonly referred to as a Ravigneaux planetary system. The planetary system has a primary sun gear 14, mounted on a main shaft 15 which traverses the main axis of the transmission and which is free to rotate about its longitudinal axis. The primary sun gear meshes with a primary planet gear set 18 having double gear elements. In this embodiment, both sets of gear elements on double gear 18 have an equal gear tooth number and radius. However, the radius of the gear elements may be varied as desired to obtain other gear ratios. A set of gear teeth 20 at one end of double gear set 18 meshes with a set of gear teeth 22 on the primary sun gear. The gear teeth 20 also mesh with gear teeth 24 on a ring gear 26. Ring gear 26 is axially aligned with primary sun gear 14 and gear teeth 20 of double planet gear 18. Ring gear 26 is positioned coaxially and rotatably about shaft 15. At its opposite end, double gear set 18 has gear teeth 28 which mesh with gear teeth 30 on a secondary planet gear set 32 made of single gears. Single and double planetary gear sets 32 and 18 are rotatably supported respectively on shafts 36 and 34. Although FIG. 1 only depicts one double gear and one single gear, the actual transmission will use multiple gears in each set, preferrably three gears for each set. Planet gear shafts 34 and 36 are supported by web portions of a compound planet carrier 38. Planet carrier 38 rotates concentrically about shaft 15. In addition to meshing with teeth 28, gear teeth 30 also mesh with teeth 40 of a secondary sun gear or reaction gear 42. A hollow shaft 41 supports sun gear 42 and rotates concentrically about shaft 15. Sun gear 42 is axially aligned with the single gear set 32 and teeth 28 of the double gear set 18.

Between planetary gears set A1 and shaft 12 is a simple planetary gear set A2. This simple planetary gear set consists of a sun gear 44 concentrically fixed to shaft 15 having an outer set of teeth 46. Teeth 46 engage teeth 48 of a planet gear set 50. Each planet gear of set 50 rotates on a support shaft 52 which is attached to the web portion of a single web planetary carrier 56. Although FIG. 1 shows only one planet gear 50, the planetary carrier preferrably supports three planet gears that make up planet gear set 50. The center portion of planet carrier 56 is connected to output shaft 12 and the planet carrier 56 rotates concentrically with shaft 12 about shaft 15. Teeth 48 of planet gear 50 also engage teeth 60 of a ring gear 58. Ring gear 58 has a common axis with sun gear 44 and is free to rotate thereabout.

Planetary sections A1 and A2 are joined by two simple connecting elements. A connecting element 62 joins planet carrier 38 of the compound planetary with ring gear 58 of the simple planetary. The other interconnection is through shaft 15 which joins the primary sun gear 16 and sun gear 44 of the simple planetary. These two interconnections are the only connection between the input shaft and the output shaft that bridge the two planetary systems.

Power input from shaft 10 to the two planetary systems is determined by clutches C1 and C2. Clutches C1 and C2 are made up of multiple disk clutch packs. Disk or plate portions of clutches C1 and C2 are located on a dual drum member 64 which is connected to shaft 10 by a web portion 66. The driven elements of clutch C1 are attached to a main shaft drum 68 which is fixed to main shaft 15. Engagement of clutch C1 simultaneously transfers power from input shaft 10 to sun gears 14 and 44 via shaft 15. The driven friction elements of clutch C2 are attached to a second clutch drum 70. A web portion 72 connects drum 70 to hollow shaft 41. By engaging clutch C2, power from shaft 10 is transferred to single planet gear set 32 by sun gear 42. In addition to determining power input, simultaneous engagement of clutches C1 and C2 will produce a direct drive as hereinafter described.

Other drive ratios are established using brakes B1-B3. Disk or plate elements for brake B1 are located on the outside of drum 70. Cooperating friction elements for grounding brake B1 are fixed to the transmission housing 74. Engagement of brake B1 prevents rotation of sun gear 42. Brake B2 has friction elements attached to the periphery of ring gear 26 and the inside of housing 74. Rotation of ring gear 26 is prevented by engagement of brake B2. Friction elements for grounding brake B3 are also attached to the inside of housing 74. The corresponding disk or plate friction elements for brake B3 are located on the outer portion of ring gear 58. However, the function of brake B3 is to restrain rotation of planet carrier 38 and any element coupled thereto. Since in this embodiment planet carrier 38 is also attached to ring gear 58, engagement of brake B3 will restrain both the ring gear and planetary carrier against rotation. As a result, when brake B3 is engaged, rotary translation of secondary planet gear set 32 and primary planet gear 18 is prevented.

This arrangement of planetary sections, interconnections and brake and clutch assemblies will provide four forward speeds and two reverse speeds. FIG. 2 shows the engagement sequence for the friction elements to produce these gear speeds. These speeds are based on the use of gears having the number of teeth indicated in FIG. 1. By use of gear elements having the specified number of teeth, the ratios specified in FIG. 2 can be obtained in each gear speed. It is, of course, well known to those skilled in the art that the specfic ratios can be varied by a different arrangement of teeth on the various gear elements. Furthermore, it is within the contemplation of this invention that the various gear speeds and directional changes may be varied by altering the interconnection between the two planetary sections. For example, the two simple interconnections may connect the two sun gears and the two planetary systems across the planet carriers and the output shaft 12 would be connected to the ring gear 58. With this arrangement, the transmission still has only two simple interconnections between the planetary sections, but now has three forward speeds and three reverse speeds. In total, it is possible to obtain six different arrangements by altering the two interconnections to the simple planetary assembly and attaching output shaft 12 to the remaining unconnected element of the simple planetary. These arrangements and the advantages associated with each are easily diskerned by those skilled in the art and can be more fully appreciated from the following operational description of the transmission shown in FIG. 1.

OPERATION

Looking then at FIG. 1, the bold lines in the figure show the path of power flow through the transmission for the lowest gear ratio or highest underdrive condition of the transmission. This condition corresponds to gear 1 from FIG. 2. As FIG. 2 shows, clutch C1 and brake B3 have been engaged. With clutch C1 engaged, power from input shaft 10 flows across drums 64 and 68 simultaneously connecting sun gears 16 and 44 to the power flow. Looking first at the compound planetary, the engagement of brake B3 fixes planetary carrier 38 against rotation, thereby, causing primary planet gear set 18 to react with sun gear 14 and secondary planet gear set 32 in turn to react with planet gear set 18. Both ring gear 26 and sun gear 42, which react with the primary planet gear set and the secondary planet gear set, respectively, are free to rotate idly in this condition. Therefore, no power flow is established through the compound planetary section. Engagement of brake B3 also fixes ring gear 58 so that planet gear set 50 reacts with the fixed ring gear to transfer all power flow from sun gear 44 through planet carrier 56 and ultimately to output shaft 12. Consequently, in first gear, power flow passes only through the simple planetary section.

Figure 3:
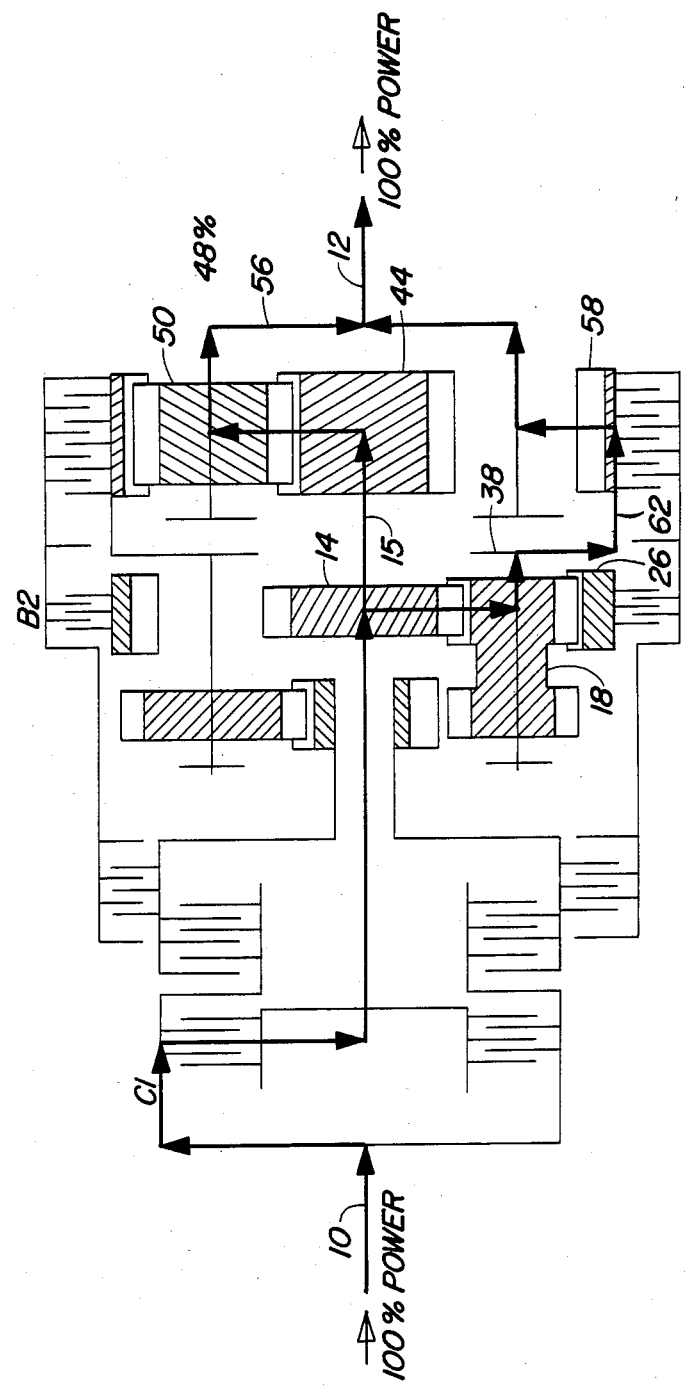
FIGS. 3-7 show the power flow through the transmission elements for the various gear drives.

Moving down FIG. 2, gear 2 is achieved by engaging clutch C1 and brake B2. Power flow for this condition is shown in FIG. 3. Once again, engagement of clutch C1 connects sun gears 14 and 44 with the power flow. With brake B3 off and brake B2 engaged, compound planetary carrier 38 rotates, under the input of sun gear 14, as primary planet gear 18 reacts with stationary ring gear 26. Planetary carrier 38 spins at a lower angular velocity than sun gear 14. With respect to the movement of sun gear 14, planetary carrier 38 rotates in the same direction. As indicated by the bold lines of FIG. 3, only a portion of the power flow is split off by sun gear 14 and transferred to the simple planetary section across connection 62. Power also flows across shaft 15 to sun gear 44. Looking then at the simple planetary, ring gear 58 and sun gear 44 are both rotating in the same direction with the sun gear 44 overrunning ring gear 58. Simultaneous reaction of the single planet gear set 50 with the rotating ring gear and sun gear increases the angular velocity of planetary carrier 56 over that obtained for the same input shaft speed in gear 1. Thus, the overall gear ratio in gear 2 is raised from that of gear 1. The power split or power contribution from each planetary system is indicated in percent on FIG. 3.

Figure 4:
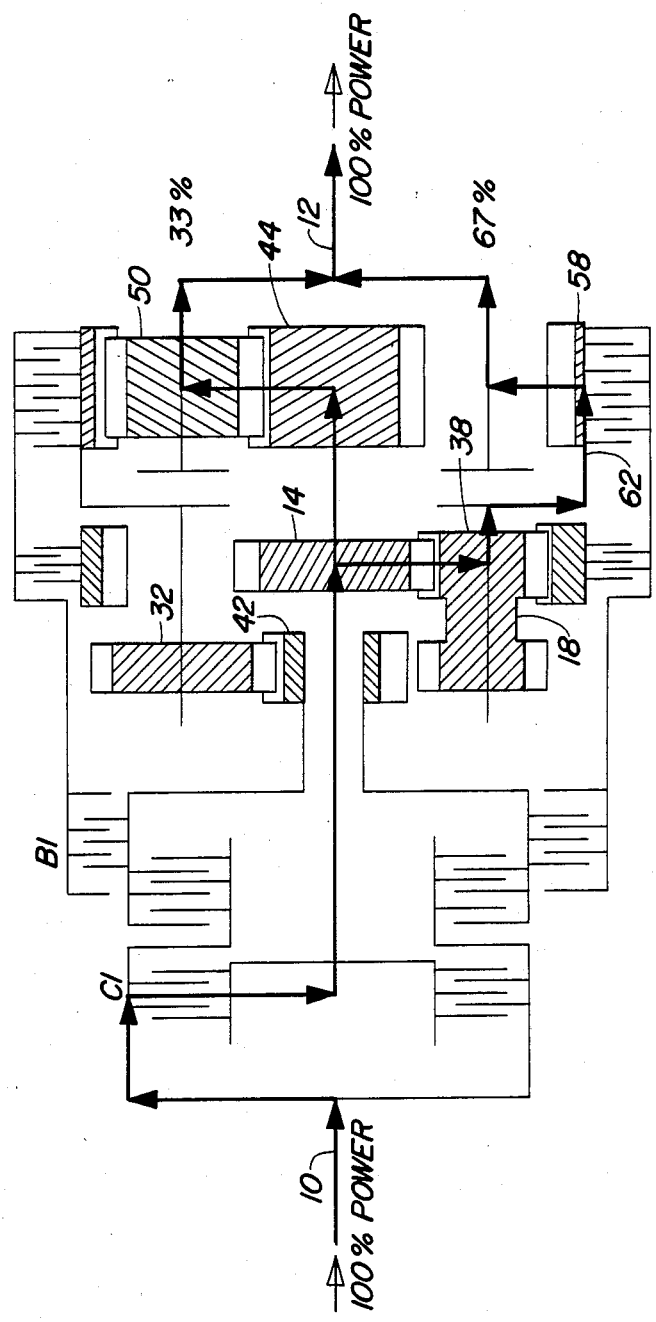

A smaller gear reduction is achieved in gear 3 by the engagement of brake B1 and clutch C1. Looking at the FIG. 4, sun gears 14 and 44 are connected to power flow from input shaft 10. In this condition brakes B3 and B2 are off while B1 is engaged so that planetary carrier 38 is free to rotate and secondary sun gear 42 reacts with secondary planet gear set 32. Planet gears 32 in turn react with primary planet gear set 18. As sun gear 14 imposes rotation on planet gear set 18, the intermeshing of these gears will cause rotary translation of the planetary carrier 38 about sun gear 42. Motion or power is in turn transmitted across connection 62 to ring gear 58. However, the relative ratio of planet gear 32 to sun gear 42 decreases the speed reduction between planetary carrier 38 and shaft 15 over that for gear 2. Therefore, although the ring gear 58 still underruns the sun gear 44, more speed, or less torque, is transferred to the simple planetary system through interconnection 62 than was transferred in gear 2. The remainder of the power to output shaft 12 is again transmitted by the interaction of sun gear 44, planet gear 50 and ring gear 58 as previously described as shown on FIG. 4. Since planetary carrier 38 is now moving at a higher speed relative to the speed of the carrier in gear 2, overall output speed of shaft 12 is increased.

Figure 5:
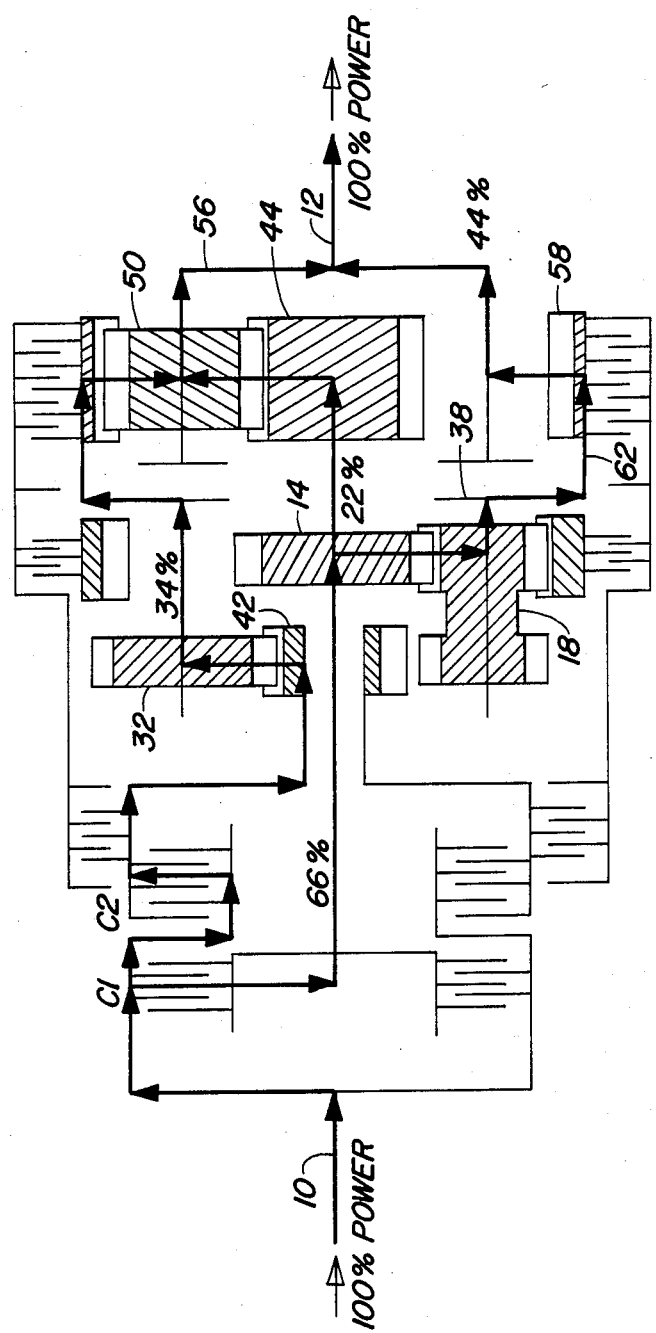

FIG. 5 shows the power flow corresponding to gear 4. Gear 4 establishes a direct drive between input shaft 10 and output shaft 12 by simultaneous engagement of clutches C1 and C2 which rotates both primary and secondary sun gears 16 and 42 in unison. Therefore, one component of power is transferred directly through clutch C2, sun gear 42, and planet gear 32 to planetary carrier 38. The remainder of the power from input shaft 10 travels through main shaft 15. A portion of the power passing through shaft 15 is split off by sun gear 14 and transferred to planetary carrier 38 via planet gear 18. Power flowing through the compound planetary section is again transferred to the simple planetary section by connection 62. Sun gear 44 transfers the remainder of the power of shaft 15 to the simple planetary system. Synchronized input into the planetary section from ring gear 58 and sun gear 44 drives planetary carrier 56 without rotation of planet gear 50 so that output shaft 12 now rotates at the same speed as sun gear 44.

Figure 6:
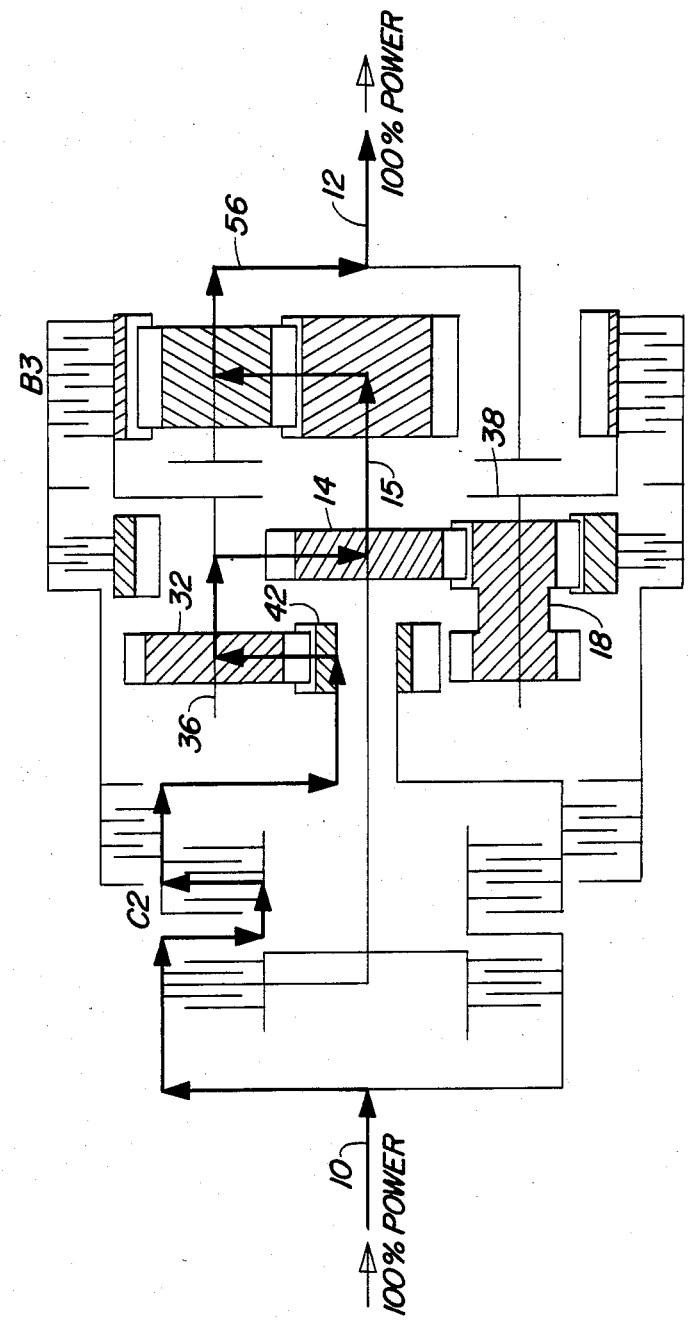
Figure 7:
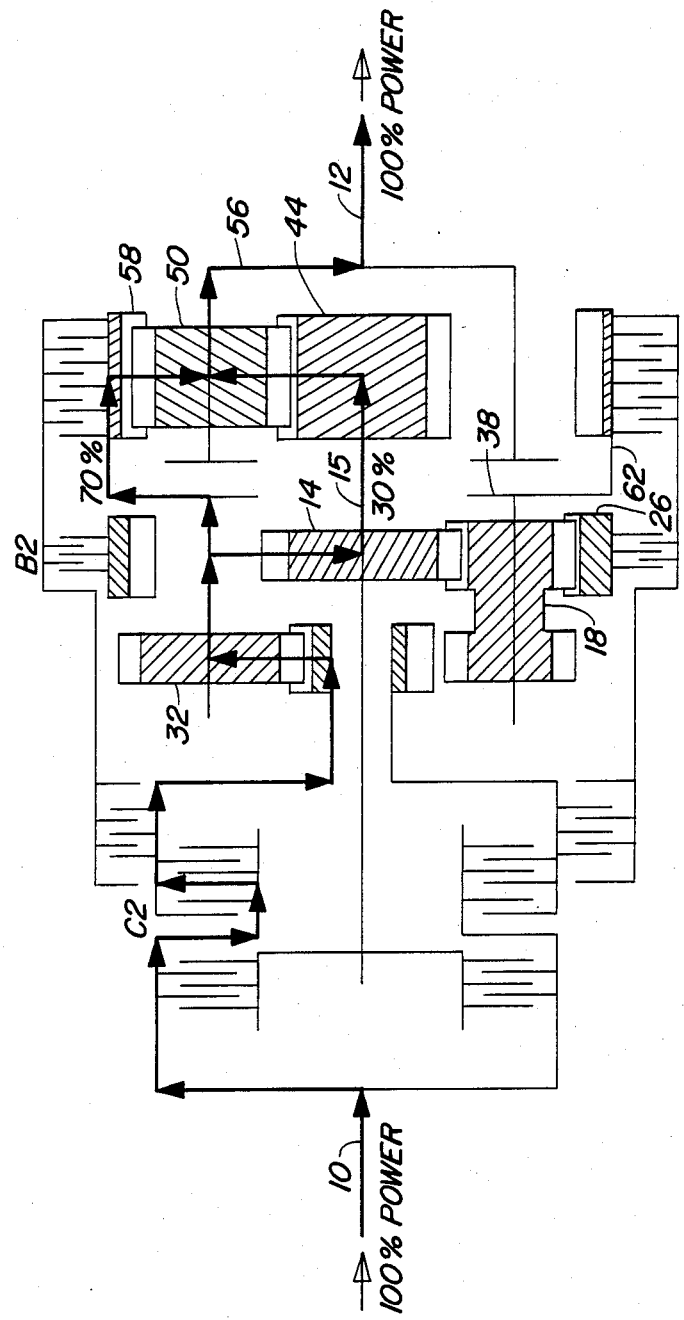

The power flow for a first reverse gear is shown in FIG. 6. Engaging friction elements C2 and B3 yields this condition. By the engagement of clutch C2, power flow from shaft 10 is transmitted to sun gear 42 in a manner previously described. Activation of brake B3 prevents rotation of planet carrier 38, forcing secondary planet gear set 32 to rotate about shaft 36 and to drive primary planet gear set 18. In this manner, planet gear 32 acts as an idler gear reversing the direction of rotation of sun gear 14 relative to input shaft 10. Power is ultimately transferred to output shaft 12 through the simple planetary section in the manner previously described for the first gear ratio. However, unlike the power flow for the first gear, the full power of input shaft 10 flows through the compound planetary section thereby raising the speed ratio of input to output before transferring power into the simple planetary section.

The last gear in chart 2 is a second reverse gear which is obtained by engaging clutch C2 and brake B2. Power flows to secondary planet gear set 32 in the manner previously described for the first reverse gear. With brake B3 off and brake B2 engaged, reaction of planet gear 18 with stationary ring gear 26 again causes planet carrier 38 to rotate in a direction opposite to the directional input from shaft 10. Holding ring gear 26 stationary causes sun gear 14 to overrun planet carrier 32 under the influence of planet gear set 18. Rotation of planet carrier 38 is transferred to ring gear 58 across connection 62, thereby transmitting 70% of the power into the simple planetary system with the remainder of the power transferred across shaft 15 to sun gear 44. With the additional rotational input from ring gear 58, planet gear set 50 revolves about sun gear 44 at a higher rotational velocity so that the rotary speed of planet carrier 56 is increased in comparison to its speed for the first reverse gear.

FIGS. 1 and 3–7 demonstrate that in all but the lowest forward and reverse gears, favorable power splitting is obtained through the two planetary sections. This power splitting results in a sharing of the load through the transmission by various transmission components for a substantial portion of the time that the transmission is operated. The reduced loading intensity and duration allows the transmission components to be reduced in size.

While this invention has been described in the context of the specific embodiment, the foregoing description will suggest many alternatives, modifications and variations to those skilled in the art. Accordingly, the scope of this invention upon which patent rights are sought embraces all such alternatives, modifications and variations which are within the scope of the appended claims.

I claim:

1. A multi-speed transmission for transferring power between a first shaft and a second shaft, said transmission comprising:
    a compound planetary assembly including a sun gear, a ring gear concentric with said sun gear, a reaction gear concentric with said ring gear, a planetary gear carrier rotatably supporting first and second sets of planet gears, said first planet gear set intermeshing with said ring gear and said sun gear and said second planet gear set intermeshing with said first planet gear set and said reaction gear, means for selectively coupling said first shaft with said sun gear and said reaction gear, and means for selectively preventing rotation of said ring gear, said reaction gear and said planetary carrier;
    a simple planetary assembly comprising a sun gear component concentric with said sun gear of said compound planetary assembly, a ring gear component concentric with both of said sun gears, and a planetary gear carrier component rotatably supporting a set of planet gears, said planet gear set meshing with said sun gear and said ring gear of said simple planetary;
    a first interconnection connected on one side thereof to the sun gear of said compound planetary assembly and connected on the other side to one component of said simple planetary;
    a second interconnection connected on one side thereof to the planetary carrier of said compound planetary assembly and connected on the other side to a second component of said simple planetary; and
    a third interconnection coupling said second shaft to a third component of said simple planetary assembly.

2. The transmission of claim 1 wherein said reaction gear is a second sun gear in said compound planetary assembly.

3. A multi-speed power shift transmission for connecting a drive and a driven shaft, said transmission comprising:
    a compound planetary section including a first sun gear, a first ring gear concentric with said sun gear, a reaction gear concentric with said ring gear, a first planetary carrier rotatably supporting first and second sets of planet gears, said first planet gear set intermeshing with said ring gear and sun gear, and said second planet gear set intermeshing with said first planet gear set and said reaction gear, means for selectively coupling said sun gear and said reaction gear with one of said shafts, means for preventing rotation of said reaction gear, and means for preventing rotation of said ring gear;
    a simple planetary assembly comprising a second sun gear concentric with said first sun gear, a second ring gear concentric with said second sun gear, means for preventing rotation of said second ring gear, and a second planetary gear carrier coupled to the other of said shafts and rotatably supporting a third set of planet gears, said third set of planet gears meshing with said second sun gear and said second ring gear;
    an interconnection coupling the first planet carrier with the second ring gear; and
    an interconnection coupling the first and second sun gears.

4. The transmission of claim 3 wherein said reaction gear is a third sun gear.

5. The transmission of claim 4 wherein said second set of planet gears have a larger diameter than said first set of planet gears.

6. A multi-speed power shift transmission for providing four forward speeds and two reverse speeds, from an input shaft to an output shaft, said transmission comprising:
    a compound planetary assembly having primary and secondary concentric sun gears, a ring gear concentric with said sun gears and a planetary carrier rotatably supporting first and second sets of planet gears, said first set of planet gears meshing with said primary sun gear and said ring gear and said second set of planet gears meshing with said secondary sun gear and said first planet gear set;
    a simple planetary assembly having a sun gear concentric with and coupled to said primary sun gear of said compound planetary assembly, a ring gear concentric with of said sun gear of said simple planetary assembly and coupled to said planetary carrier of said compound planetary assembly, and a planetary carrier rotatably supporting a single set of planet gears and coupled to said output shaft, said planet gears of said simple planetary meshing with said sun gear and said ring gear of said simple planetary;
    a first drive clutch for selectively connecting said input shaft to said primary sun gear of said compound planetary assembly;
    a second drive clutch for selectively connecting said input shaft to said secondary sun gear of said compound planetary assembly;
    a first brake for preventing rotation of said secondary sun gear of said compound planetary assembly;
    a second brake for preventing rotation of said ring gear of said compound planetary assembly; and
    a third brake for preventing rotation of said planetary carrier of said compound planetary assembly.

7. The transmission of claim 6 wherein said first planet gear set of said compound planetary assembly includes double pinion gears having the same number of teeth and a smaller diameter than the second planet gear set of said compound planetary asssembly.

* * * * *